United States Patent
Calico et al.

(10) Patent No.: US 8,600,290 B2
(45) Date of Patent: Dec. 3, 2013

(54) HYBRID BAND DIRECTED ENERGY TARGET DISRUPTION

(75) Inventors: Steve E. Calico, Ft. Worth, TX (US); David (Dave) S. Hidinger, Colleyville, TX (US); Michael C. Scott, Rockwall, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 1092 days.

(21) Appl. No.: 11/758,455

(22) Filed: Jun. 5, 2007

(65) Prior Publication Data

US 2008/0304549 A1 Dec. 11, 2008

(51) Int. Cl.
*H04K 3/00* (2006.01)
*H04B 1/00* (2006.01)

(52) U.S. Cl.
USPC ............. 455/1; 375/131; 375/322; 375/271; 375/275

(58) Field of Classification Search
USPC ................ 375/131, 322, 271, 275; 455/1
See application file for complete search history.

(56) References Cited

U.S. PATENT DOCUMENTS

| | | | |
|---|---|---|---|
| 2,914,761 A * | 11/1959 | Ortusi et al. ............... | 342/200 |
| 3,617,947 A * | 11/1971 | Jensen et al. ............... | 332/124 |
| 3,659,293 A * | 4/1972 | Gupta ............... | 342/129 |
| 4,027,837 A * | 6/1977 | Miller et al. ............... | 244/3.16 |
| 4,047,678 A * | 9/1977 | Miller et al. ............... | 244/3.16 |
| 4,875,175 A * | 10/1989 | Egee et al. ............... | 702/30 |
| 4,895,441 A * | 1/1990 | Allen, Jr. ............... | 356/5.09 |
| 5,180,922 A * | 1/1993 | Hug ............... | 250/559.38 |
| 5,245,484 A * | 9/1993 | Sato ............... | 386/276 |
| 6,087,979 A * | 7/2000 | Magori et al. ............... | 342/128 |
| 6,611,569 B1 * | 8/2003 | Schier et al. ............... | 375/322 |
| 6,784,867 B1 * | 8/2004 | Chang ............... | 345/102 |
| 7,405,812 B1 * | 7/2008 | Bamji ............... | 356/5.1 |
| 8,035,550 B2 * | 10/2011 | Holly et al. ............... | 342/175 |
| 2002/0027698 A1 | 3/2002 | Kawanishi ............... | 359/238 |
| 2004/0105087 A1 | 6/2004 | Gogolla et al. ............... | 356/3 |
| 2004/0222184 A1 | 11/2004 | Hayami et al. ............... | 216/16 |
| 2005/0260952 A1 | 11/2005 | Santhoff et al. ............... | 455/88 |
| 2006/0017607 A1 * | 1/2006 | Hayata et al. ............... | 342/41 |
| 2006/0217101 A1 | 9/2006 | Connell et al. ............... | 455/323 |
| 2007/0139247 A1 * | 6/2007 | Brown et al. ............... | 342/13 |
| 2007/0206702 A1 * | 9/2007 | Adler et al. ............... | 375/295 |
| 2008/0139138 A1 | 6/2008 | Matsuura et al. ............... | 455/108 |
| 2008/0156219 A1 * | 7/2008 | Voss et al. ............... | 102/402 |
| 2010/0182189 A1 * | 7/2010 | Jung et al. ............... | 342/22 |
| 2010/0289686 A1 * | 11/2010 | Jung et al. ............... | 342/14 |

* cited by examiner

*Primary Examiner* — Bobbak Safaipour

(74) *Attorney, Agent, or Firm* — Withrow & Terranova, PLLC

(57) ABSTRACT

A technique for disrupting the operation of a target containing nonlinear electronic devices generally includes generating a high frequency signal; generating a low frequency signal; modulating the high frequency signal with the low frequency signal; and emitting the modulated high frequency signal at the target.

20 Claims, 3 Drawing Sheets

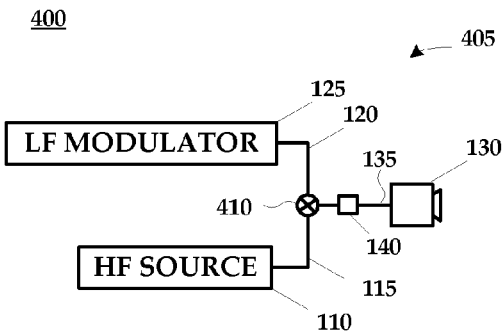
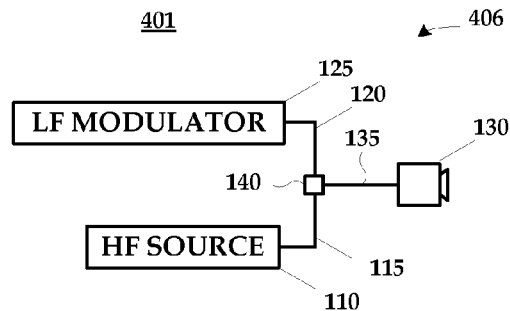
FIG. 4A  FIG. 4B
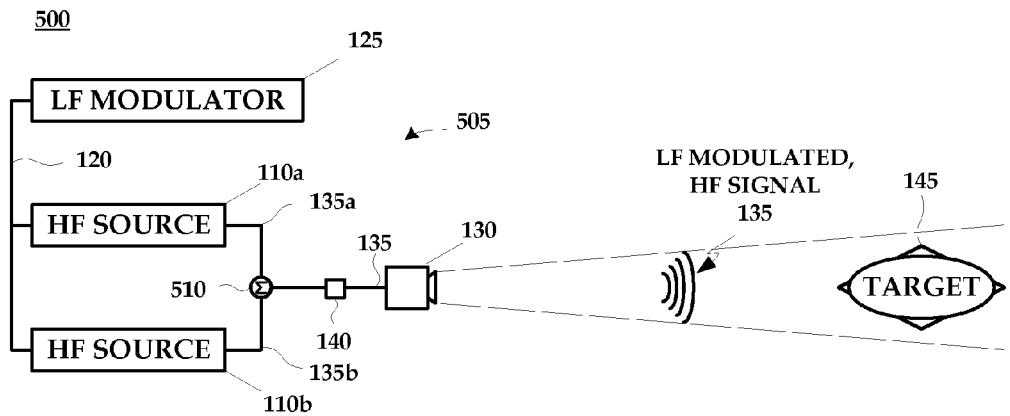
FIG. 5
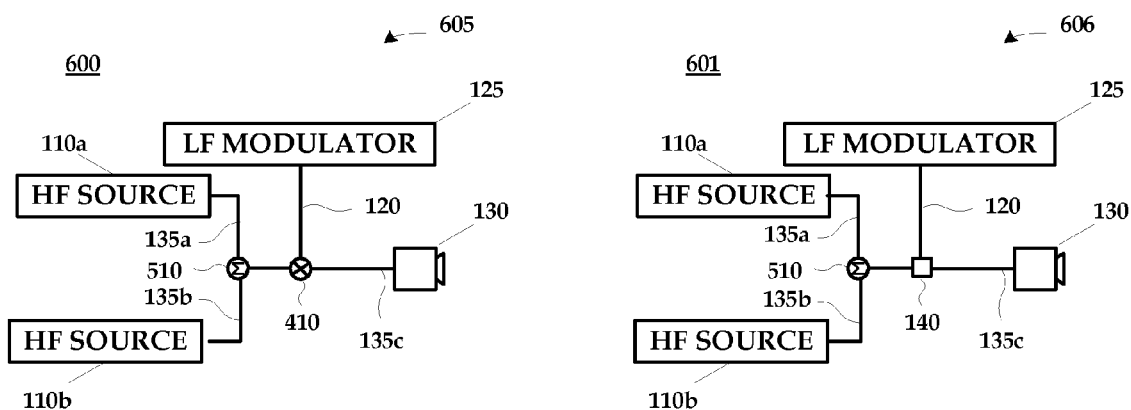
FIG. 6A  FIG. 6B

HYBRID BAND DIRECTED ENERGY TARGET DISRUPTION

BACKGROUND OF THE INVENTION

1. Field of the Invention

The present invention pertains to directed energy systems and, more particularly, to directed energy target disruption.

2. Description of the Related Art

One interesting application of directed energy systems is target disruption. Target disruption temporarily interferes with the normal operation of the target. It is non-destructive, and non-lethal. When the target is illuminated with the directed energy, it ceases to work correctly, only to resume proper function when the illumination is removed.

Historically, target disruption has been performed using low frequency signals. Substantial experience has demonstrated that signals of frequencies at or above about 10 GHz yield unsatisfactory results. Conventional practice typically utilizes signals whose frequencies are at or below about 2 GHz. Signals in the 1 kHz-1 GHz range have been demonstrated to be particularly effective against certain target sets. However, low frequency signals still have some drawbacks. For example, they require electrically large antennas to generate effective electric fields at relatively long ranges; this limitation disqualifies these sources from many applications.

The present invention is directed to resolving, or at least reducing, one or all of the problems mentioned above.

SUMMARY OF THE INVENTION

The invention includes, in its various embodiments and aspects, a method and apparatus implementing a techniques for disrupting the operation of a target containing nonlinear electronic devices. The technique generally includes generating a high frequency signal; generating a low frequency signal; modulating the high frequency signal with the low frequency signal; and emitting the modulated high frequency signal at the target.

BRIEF DESCRIPTION OF THE DRAWINGS

The invention may be understood by reference to the following description taken in conjunction with the accompanying drawings, in which like reference numerals identify like elements, and in which:

FIG. 4A-FIG. 4B illustrate alternative variations on the embodiment of FIG. 1;

FIG. 5 illustrates a second embodiment of the present invention; and

FIG. 6A-FIG. 6E illustrate alternative variations on the embodiment of FIG. 5.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
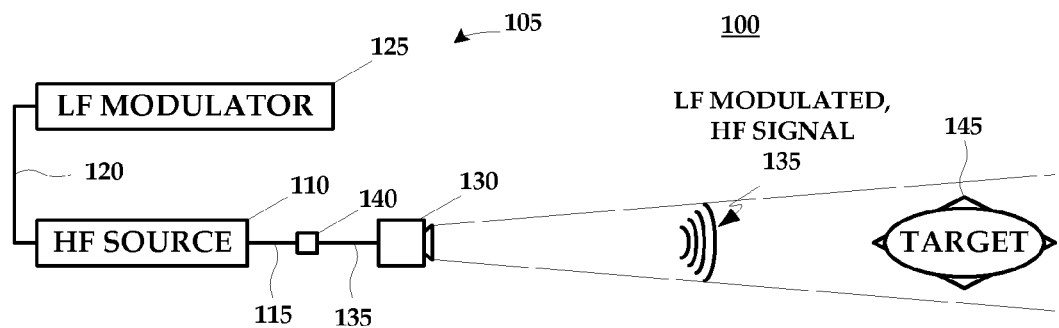
FIG. 1 is a block diagram of a scenario in which an apparatus is constructed and operated in accordance with the present invention.

FIG. 1 is a block diagram of a scenario 100 in which an apparatus 105 is constructed and operated in accordance with the present invention. The apparatus 105 includes a high frequency ("HF") source 110 whose output 115 is modulated by a signal 120 output by a low frequency ("LF") modulator 125. The modulated HF signal 115 is amplified by an amplifier 140, shown in FIG. 2, and the amplified signal 135 is radiated from an antenna 130. In this context, "high" frequency is greater than about 10 GHz and "low" frequency is less than about 1 GHz. Terms such as "about" or "approximately" used in connection with this range are a recognition of the impact of factors such as tolerances and atmospherics on signal generation and propagation.

The HF source 110 may be, for example, an HP83640B RF synthesizer commercially available off the shelf from Agilent Technologies, Inc., at 5301 Stevens Creek Blvd, Santa Clara, Calif. 95051, United States, telephone: +1 (877) 424-4536, facsimile: +1 (408) 345-8474 or over the World Wide Web of the Internet at www.agilent.com. The LF modulator 125 may be, for example, an AGILENT 33220A function generator commercially available off the shelf from Agilent Technologies. The HF signal 115 is a continuous wave signal whose waveform is, in the illustrated embodiment, a sinusoidal wave. The waveform of the LF signal 120 is, in the illustrated embodiment, a square wave. However, the invention admits wide variation in implementation. The waveform of the LF signal 120, for instance, may be a sine wave in alternative embodiments.

The pulse repetition frequency and duty cycle of the modulating LF signal are significantly contributing parameters for the effectiveness of the Hybrid Band waveform.

The preferred pulse width (PW) and pulse repetition frequency (PRF) of the LF signal 120 is a function of the specific non-linear device in the target 145. Different device types will be disrupted by a range of LF modulations, and the particular values of PRF and PW required must be characterized for the device type, and sometimes for the specific device application. This fact also applies to traditional RF directed energy systems. No single frequency is equally effective against all targets; each directed energy system must be characterized for effectiveness against its intended targets. The parameters of LF modulation would need to be established either analytically, if an interaction model of sufficient detail exists for the targeted device, or empirically, as is commonly done with traditional RF directed energy sources.

The specific phenomenology of RF interaction with electronic devices is still under study, and traditional applications of RF directed energy express effectiveness as a Probability of Effect against a target as a function of power density (typically measured in watts per square centimeter) at the target. The same measures and approach can be used to design applications of H-Band. The effective radiated power of the system required to affect a target can be determined using traditional models and calculations. The advantages of H-Band will manifest themselves by the lower power density required at the target, and/or by the higher Effective Radiated Power (ERP) for a source of similar size and weight.

The invention also admits wide variation in the manner in which the LF modulated HF signal 135 is modulated. In the illustrated example, the LF modulated HF signal 135 is amplitude modulated by the LF signal 120 at a 100% depth of modulation. Other modulation techniques may be employed. Such alternative modulation techniques may include lesser depths of modulation, although at an increased power requirement. Alternative modulation techniques may also consist of different pulse repetition frequencies and duty factors.

The LF modulated, HF signal 135 output by the apparatus 105 is emitted toward a target 145. As mentioned above, the LF modulated, HF signal 135 is emitted using antenna 130. The antenna 130 is, in the illustrated embodiment, a pyramidal horn, which is commercially available off the shelf available from Narda Microwave at L-3 Communications Narda Microwave—West 107 Woodmere Road, Folsom, Calif. 95630, USA, telephone: 916-351-4500, facsimile: 916-351-4550, or over the World Wide Web of the Internet at http://www.nardamicrowave.com/. The invention also admits wide variation in the manner in which the HF signal 124 is modulated. In the illustrated example, the HF signal 124 is modulated by toggling the HF source 110 between "ON" and "OFF" states. However, other modulation techniques may be employed. Such alternative modulation techniques may include a sinusoidal modulation of the amplifier power.

The LF modulated, HF signal 135 output by the apparatus 105 is emitted toward a target 1345. As mentioned above, the LF modulated, HF signal 135 is emitted using antenna 130. Note that the LF modulated, HF signal 135 is conditioned in the illustrated embodiment using the circuit shown in FIG. 2.

The target 145 is an electronic apparatus of some kind comprised of, among other things, nonlinear electronic devices (not shown). Nonlinear electronic devices include, for example, diodes, oscillators, analog-to-digital converters, digital-to-analog converters, phase-locked-loops, transistors, operational amplifiers, and other components and circuits. Those in the art will realize that this list is illustrative only, and is not exhaustive. Nonlinear electronic devices are well known across many arts and the target 145 may include any nonlinear electronic device.

It is known that the efficacy of the present invention is tied to some relationship between the frequency of the modulation and the frequencies of the circuits including the nonlinear electronic devices. Thus, some degree of tuning may be desirable in some embodiments where the nature and/or composition of the target 145 is known or suspected a priori. However, the relationship is not well understood and the current tuning technique is the application of trial and error.

Figure 3:
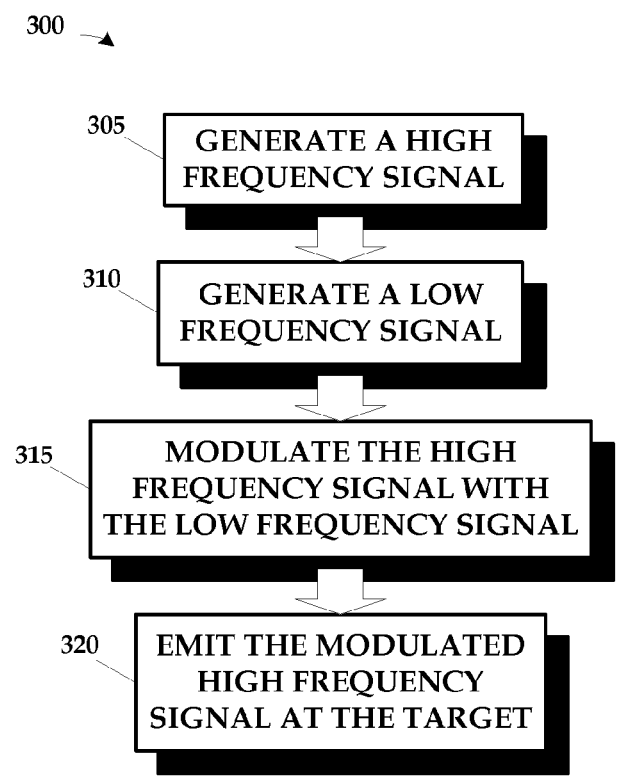
FIG. 3 illustrates a method performed in accordance with one particular aspect of the present invention.

FIG. 3 illustrates a method 300 performed in accordance with one particular aspect of the present invention. The method 300 may be implemented in, for example, the operation of the apparatus 105 in FIG. 1. The method 300 begins by generating (at 305) a high frequency signal and generating (at 310) a low frequency signal. Next, the high frequency signal is modulated (at 315) by the low frequency signal. Finally, the modulated high frequency signal is emitted (at 320) at the target.

FIG. 4A-FIG. 4B illustrate alternative variations on the embodiment of FIG. 1. The scenario 400, shown in FIG. 4A, employs an apparatus 405 in which the high frequency signal 115 is modulated by the low frequency signal 120 by mixing the two signals. Mixers such as the mixer 410 are well known on the art and are readily commercially available off the shelf. Any suitable mixer may be employed. In the scenario 401, shown in FIG. 4B, an apparatus 406 employs the amplifier 140, better shown in FIG. 2, to combined the high and low frequency signals 115, 120.

The invention admits variation in implementation, such as that shown in FIG. 5. In the scenario 500 of FIG. 5, the apparatus 505 includes two HF sources 110a, 110b, both of which are modulated by a common LF modulator 125. The frequencies of the HF sources 110a, 110b are offset by a small amount, usually a value from the typical range of LF modulations. The frequency difference (offset) should be distinct and different from the LF modulator 125 for each implementation.

Figure 2:
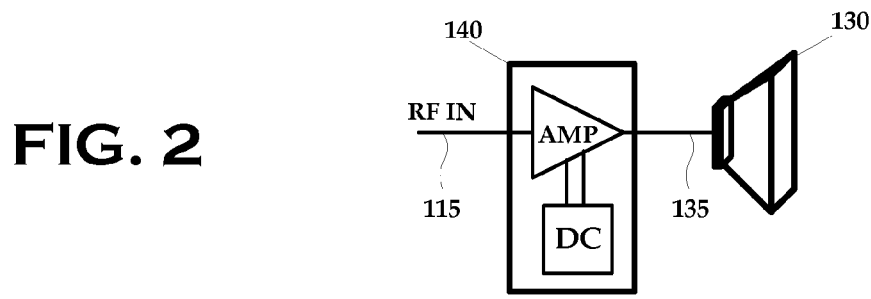
FIG. 2 illustrates a conditioning circuit in the apparatus of FIG. 1.

The LF modulated HF signals 135a, 135b are then combined by a combiner 510 and amplified by the amplifier 140 and broadcast via the antenna 130. The signals 135a, 135b are combined by a combiner 510. Combiners such as the combiner 510 are well known on the art and are readily commercially available off the shelf. Any suitable combiner may be employed. The amplifier 140 is shown in FIG. 2. The target 145 sees a beat frequency in the output signal 135. The beat frequency of the output signal 135 is LF modulated, as well, and causes the effect of the invention's application on the non-linear electronics of the target 145. This, in turn, disrupts the operation of the target 145. This implementation would be useful in cases where the target was known or suspected to have components that were susceptible to different LF radiation frequencies.

Figure 6C:
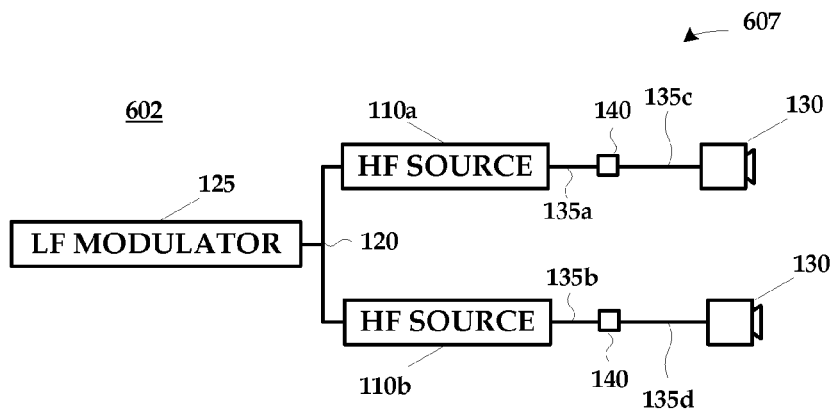
Figure 6D:
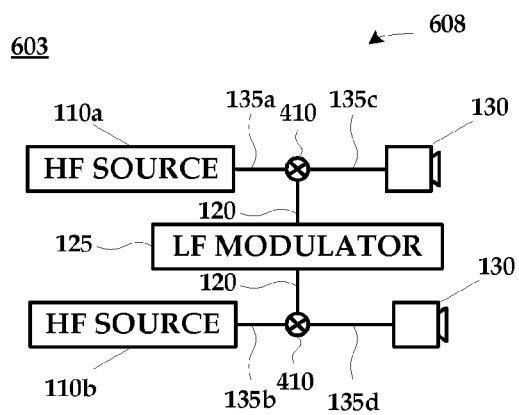
Figure 6E:
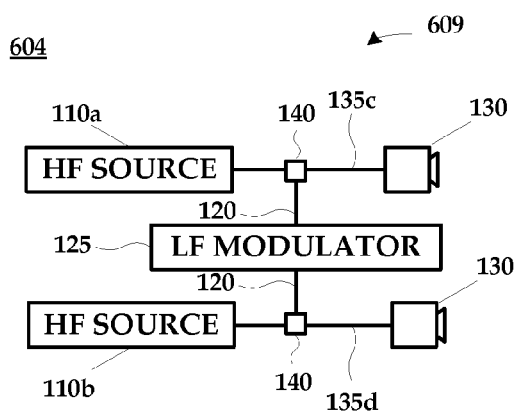

FIG. 6A-FIG. 6E illustrate a plurality of scenarios 600-604 that are a variations on the theme of the scenario 500 in FIG. 5. In the scenario 600 of FIG. 6A, the modulation occurs after the combining of the frequency offset, HF signals output by the HF sources 110a, 110b by mixing with the LF signal 120. In the scenario 601 of FIG. 6B, modulation occurs after combination of the signals 135a, 135b. FIG. 6C illustrate a scenario 602, in which the modulated HF signals 135c are neither combined nor mixed. In the scenario 603 of FIG. 6D, a common LF signal 120 is mixed with the HF signals 135a, 135b. FIG. 6E illustrates a scenario 604 wherein modulation occurs through the amplifiers 140. In each case, the resultant signals 135c and 135d performs in the same manner and has the same effect on the target 145 as does the signal 135 in the scenario 500 of FIG. 5. Still other variations may become apparent to those in the art having the benefit of this disclosure.

Thus, by modulating the high frequency source (e.g., greater than about 10 GHz) at a low frequency (e.g., less than about 1 GHz), low frequency effects are produced from the high frequency signal. Modifying the high frequency source of the RF energy nevertheless provides a more efficient method of energy transfer allowing transmission across greater distances and the application of lower average power levels to achieve the desired effect. The present invention also, by permitting use of higher frequency sources, also yields associated advantages in antenna size and propagation. By modulating the source at less than about 1 GHz rates, low frequency effects are produced from the high frequency signal. Consequently, the present invention propagates energy with the efficiencies of the HF signal, while disrupting the target with the effectiveness of the LF signal. The ability to design an LF modulation that is effective is constrained in the same manner as for a traditional RF directed energy system.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for disrupting the operation of a target containing nonlinear devices, the method comprising:
   generating a high frequency signal;
   generating a low frequency signal;
   modulating the high frequency signal with the low frequency signal to generate a first modulated signal;
   generating a second high frequency signal;
   modulating the second high frequency signal with the low frequency signal to generate a second modulated signal;
   combining the first modulated signal and the second modulated signal to generate a combined signal; and
   emitting the combined signal at the target.

2. The method of claim 1, wherein generating the high frequency signal includes generating a signal of greater than about 10 GHz.

3. The method of claim 1, wherein generating the low frequency signal includes generating a signal of less than about 1 GHz.

4. The method of claim 1, wherein generating the low frequency signal includes generating a sine wave signal or a square wave signal.

5. The method of claim 1, wherein modulating the high frequency signal includes pulsing the high frequency signal at a rate of the low frequency signal.

6. The method of claim 1, wherein generating the high frequency signal includes:
   generating a first high frequency signal;
   generating the second high frequency signal; and
   combining the first and second high frequency signals.

7. The method of claim 1, wherein modulating the high frequency signal with the low frequency signal includes driving an amplification of the high frequency signal with the low frequency signal.

8. The method of claim 1, wherein modulating the high frequency signal with the low frequency signal includes mixing the high frequency signal and the low frequency signal.

9. An apparatus for disrupting the operation of a target containing nonlinear electronic devices, the apparatus comprising:
   means for generating a high frequency signal;
   means for generating a low frequency signal;
   means for modulating the high frequency signal with the low frequency signal to generate a first modulated signal; and
   means for generating a second high frequency signal;
   means for modulating the second high frequency signal with the low frequency signal to generate a second modulated signal;
   means for combining the first modulated signal and the second modulated signal to generate a combined signal; and
   means for emitting the low frequency modulated, high frequency combined signal at a electronic devices of the target.

10. The apparatus of claim 9, wherein the high frequency signal generating means includes means for generating a signal of greater than about 10 GHz.

11. The apparatus of claim 9, wherein the low frequency signal generating means includes means for generating a signal of less than about 1 GHz.

12. The apparatus of claim 9, wherein the modulating means includes means for pulsing the high frequency signal at a rate of the low frequency signal.

13. The apparatus of claim 10, wherein the high frequency signal generating means includes:
   means for generating a first high frequency signal;
   means for generating the second high frequency signal; and
   means for combining the first and second high frequency signals.

14. The apparatus of claim 9, wherein the modulating means includes means for driving an amplification of the high frequency signal with the low frequency signal.

15. The apparatus of claim 9, wherein the modulating means includes means for mixing the high frequency signal and the low frequency signal.

16. A method for disrupting the operation of a target containing nonlinear electronic devices, the method comprising:
   generating a high frequency signal of greater than about 10 MHz;
   generating a low frequency signal of less than about 1 GHz;
   modulating the high frequency signal with the low frequency signal to generate a first modulated signal;
   generating a second high frequency signal;
   modulating the second high frequency signal with the low frequency signal to generate a second modulated signal;
   combining the first modulated signal and second modulated signal to generate a combined signal; and
   emitting the combined signal at the target.

17. The method of claim 16, wherein modulating the high frequency signal includes pulsing the high frequency signal at a rate of the low frequency signal.

18. The method of claim 16, wherein generating the high frequency signal includes:
   generating a first high frequency signal;
   generating the second high frequency signal; and
   combining the first and second high frequency signals.

19. The method of claim 16, wherein modulating the high frequency signal with the low frequency signal includes driving an amplification of the high frequency signal with the low frequency signal.

20. The method of claim 16, wherein modulating the high frequency signal with the low frequency signal includes mixing the high frequency signal and the low frequency signal.

* * * * *

UNITED STATES PATENT AND TRADEMARK OFFICE
CERTIFICATE OF CORRECTION

| | | |
|---|---|---|
| PATENT NO. | : 8,600,290 B2 | |
| APPLICATION NO. | : 11/758455 | |
| DATED | : December 3, 2013 | |
| INVENTOR(S) | : Calico et al. | |

It is certified that error appears in the above-identified patent and that said Letters Patent is hereby corrected as shown below:

In the Claims

Col. 5, Line 52 - Col. 6, Line 9 in claim 9, replace:

"An apparatus for disrupting the operation of a target containing nonlinear electronic devices, the apparatus comprising: means for generating a high frequency signal; means for generating a low frequency signal; means for modulating the high frequency signal with the low frequency signal to generate a first modulated signal; and means for generating a second high frequency signal; means for modulating the second high frequency signal with the low frequency signal to generate a second modulated signal; means for combining the first modulated signal and the second modulated signal to generate a combined signal; and means for emitting the low frequency modulated, high frequency combined signal at a electronic devices of the target." with -- "An apparatus for disrupting the operation of a target containing nonlinear electronic devices, the apparatus comprising: means for generating a high frequency signal; means for generating a low frequency signal; means for modulating the high frequency signal with the low frequency signal to generate a first modulated signal; means for generating a second high frequency signal; means for modulating the second high frequency signal with the low frequency signal to generate a second modulated signal; means for combining the first modulated signal and the second modulated signal to generate a combined signal; and means for emitting the combined signal at the target." --.

Col. 6, Line 19-25 in claim 13, replace:

"The apparatus of claim 10, wherein the high frequency signal generating means includes: means for generating a first high frequency signal; means for generating the second high frequency signal; and means for combining the first and second high frequency signals." with -- "The apparatus of claim 9, wherein the high frequency signal generating means includes: means for generating a first high frequency signal; means for generating the second high frequency signal; and means for combining the first and second high frequency signals." --.

Signed and Sealed this
Twenty-fourth Day of June, 2014

Michelle K. Lee
*Deputy Director of the United States Patent and Trademark Office*